US007007593B2

(12) United States Patent
Huang et al.

(10) Patent No.: US 7,007,593 B2
(45) Date of Patent: Mar. 7, 2006

(54) BARBECUE RACK WITH MOVABLE AND SWIVELABLE SPIT HOLDERS

(76) Inventors: Ko-Chen Huang, No. 42, Lane 38, Guanye W. Rd., Pingjhen City, Taoyuan County 324 (TW); Kuo-Chang Chen, No. 75, Zihli St., Yangmei Town, Taoyuan County, 326 (TW)

( * ) Notice: Subject to any disclaimer, the term of this patent is extended or adjusted under 35 U.S.C. 154(b) by 0 days.

(21) Appl. No.: 11/030,911

(22) Filed: Jan. 10, 2005

(65) Prior Publication Data

US 2005/0188858 A1 Sep. 1, 2005

(30) Foreign Application Priority Data

Feb. 27, 2004 (TW) .............................. 93202885 U

(51) Int. Cl.
*A47J 37/04* (2006.01)
(52) U.S. Cl. ..................... 99/421 H; 99/419
(58) Field of Classification Search ...... 99/419–421 V, 99/339, 340, 386, 444–450, 426, 427; 126/9 R, 126/25 R, 41 R
See application file for complete search history.

(56) References Cited

U.S. PATENT DOCUMENTS

| 3,058,414 | A | * | 10/1962 | Armstrong | 99/421 HH |
| 3,169,470 | A | * | 2/1965 | Oatley | 99/421 R |
| 3,734,740 | A | * | 5/1973 | Zenos | 426/383 |
| 4,158,991 | A | * | 6/1979 | Nakashima | 99/421 H |
| 4,760,776 | A | * | 8/1988 | Beidler | 99/421 H |
| 5,460,080 | A | * | 10/1995 | Maru, Jr. | 99/420 |
| 5,720,217 | A | * | 2/1998 | Pappas | 99/421 H |
| 6,279,465 | B1 | * | 8/2001 | English | 99/339 |
| 6,484,625 | B1 | * | 11/2002 | Waltman | 99/421 HH |
| 6,595,119 | B1 | * | 7/2003 | Cheung | 99/420 |
| 6,813,993 | B1 | * | 11/2004 | Liu | 99/421 A |
| 6,837,151 | B1 | * | 1/2005 | Chen | 99/421 H |
| 2001/0013276 | A1 | * | 8/2001 | McConnell | 99/421 H |

* cited by examiner

Primary Examiner—Timothy F. Simone
(74) Attorney, Agent, or Firm—Rosenberg, Klein & Lee

(57) ABSTRACT

A barbecue rack with movable and swivelable spit holders comprising a hollow rack body in which a barbecue area is formed and under which a supporting base of whole set is disposed; at least one power chain in cooperation with two chain sprockets mounted at one side of the rack body to drive the chain; at least one horizontal rod disposed outside the power chain; and at least one spit holder that is mounted the horizontal rod and can move axially and rotate about the horizontal rod. The above mentioned spit holder consists of a main body, an adjusting rod, a bearing holder, a chain wheel and a positioning element. To turn the adjusting rod can move the spit holder in axial direction. The spit holder is swivelable in vertical position or in horizontal position to enable the engagement of the chain wheel with the power chain, thereby rotating the positioning element to achieve an optimal barbecuing effect.

8 Claims, 9 Drawing Sheets

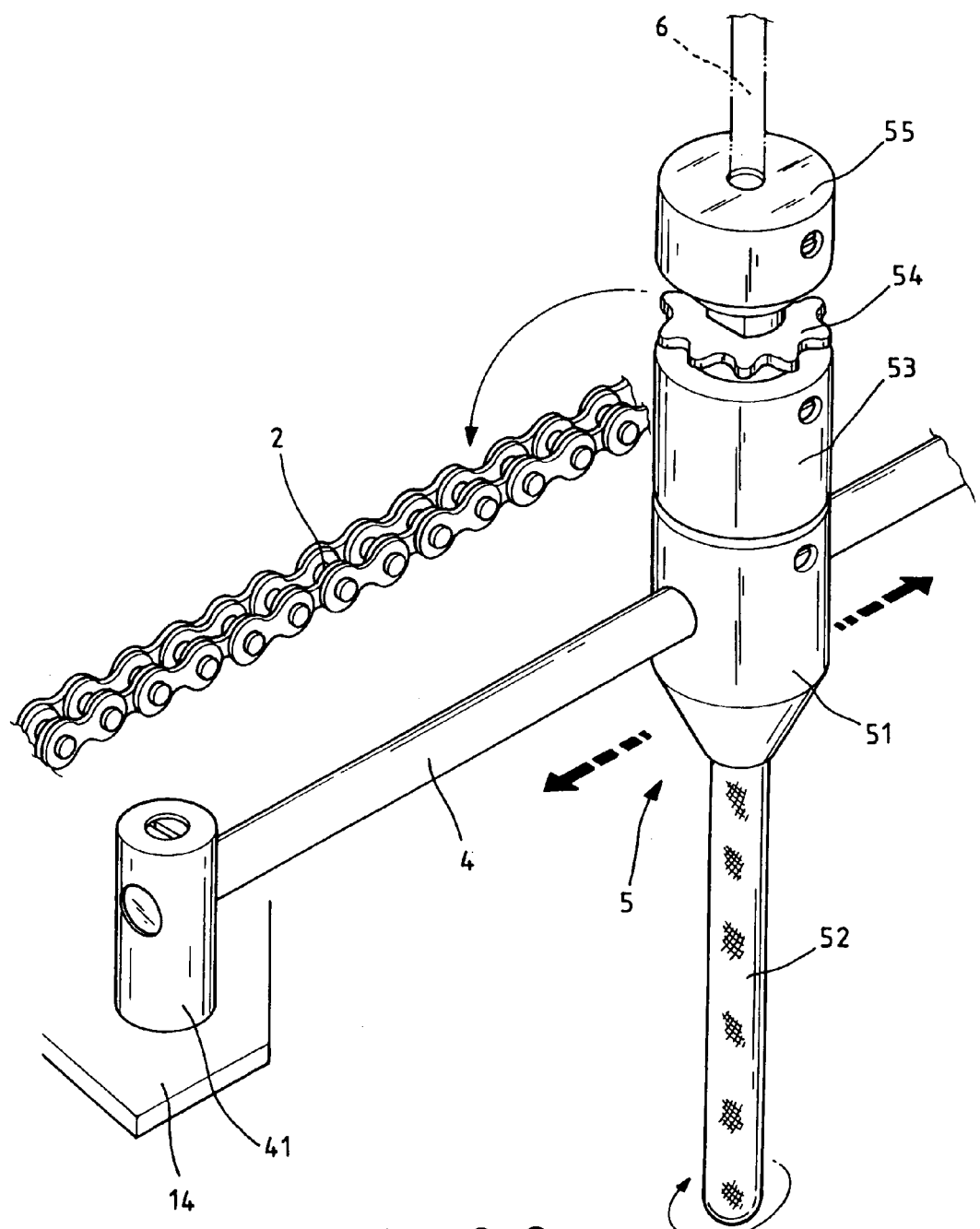
F I G. 6

BARBECUE RACK WITH MOVABLE AND SWIVELABLE SPIT HOLDERS

BACKGROUND OF THE INVENTION

1. Field of the Invention

The present invention relates to a barbecue rack, and more particularly to a barbecue rack with movable and swivelable spit holders.

2. Description of the Prior Art

Barbecue has been a popular relaxation and it is also a way that concentrates the affectional atmosphere in the circle of friend and family. Therefore, either in the suburb outing or in the festivals, barbecue can be seen anywhere. Especially in the middle moon festival, barbecue is so popular that the whole country seems to barbecue.

The most important instrument of barbecue is the barbecue rack. However, the conventional barbecue rack seems to be too primitive. Neither it is convenient to be used, nor can the meat be roasted with pleasant color, aroma and taste. Moreover, the meat easily becomes scorched by mistake.

The related patents concerning barbecue rack are announced with the following numbers TW 30 1 228, 276473, 271070, 441336, 405393, 269161, 367803, 501461, etc.

The above mentioned patents have different emphasis and are limited to one specific function respectively. For example, TW 391228 and 367803 disclose a type of barbecue rack in which a chain is driven by a motor and it rotates several spit holders simultaneously. But the spit holders in this barbecue rack can only be moved but not be swiveled. So, the half-finished and the finished meat can't be swiveled in different position to indicate the status of the roasted food. Therefore, the food easily becomes scorched. Furthermore, the set of spit holders is formed in a body. It is not convenient for use because the whole set rotates.

TW 276473 teaches a structure that a motor drives a plate belts to rotate the spit holders in connection with the belt. Unlike the positive interlocking between the chain and the sprocket, this structure utilized only a frictional force to rotate the spit holders. This kind of frictional transmission is not practical and it may be considerably influenced or stopped by the malposition or bad contact. In this case, the food will be unevenly roasted or even become scorched. Furthermore, the application is limited because the belt can only be electrically driven and can not be rotated by hand.

In a word, the current barbecue racks do have some specific functions but they are not in ideal status. The inventor is specialized in this study of innovation to overcome the above mentioned disadvantages.

SUMMARY OF THE INVENTION

It is a primary object of the invention to provide a new type of barbecue rack in which the spit holders are movable and swivellable. The transmission is stable and the spit holders rotate very smoothly, and the barbecue quality will be much improved.

Another object of the invention is to provide a barbecue rack with movable and swivelable spit holders that are driven either by a motor or by hand. It is also convenient when they are driven by motor and by hand simultaneously.

A further object of the invention is to provide a barbecue rack with movable and swivelable spit holders that can be lifted to adjust the angle and indicate the status of the roasted food. Therefore it's avoidable that the food is roasted too much or not enough. In this way, the roasted food will achieve perfect color, aroma and taste so that people can have fun in barbecue.

Still another object of the invention is to provide a barbecue rack with movable and swivelable spit holders that clamping unit of the spit holders can be replaced to receive all kinds of spits. Thus, it can be regarded as a multifunctional unit.

BRIEF DESCRIPTION OF THE DRAWINGS

The accomplishment of this and other objects of the invention will become apparent from the following descriptions and its accompanying drawings of which:

FIG. 6 is a perspective view of the assembled spit holder in accordance with FIG. 5;

DETAILED DESCRIPTION OF THE PREFERRED EMBODIMENT

Figure 1:
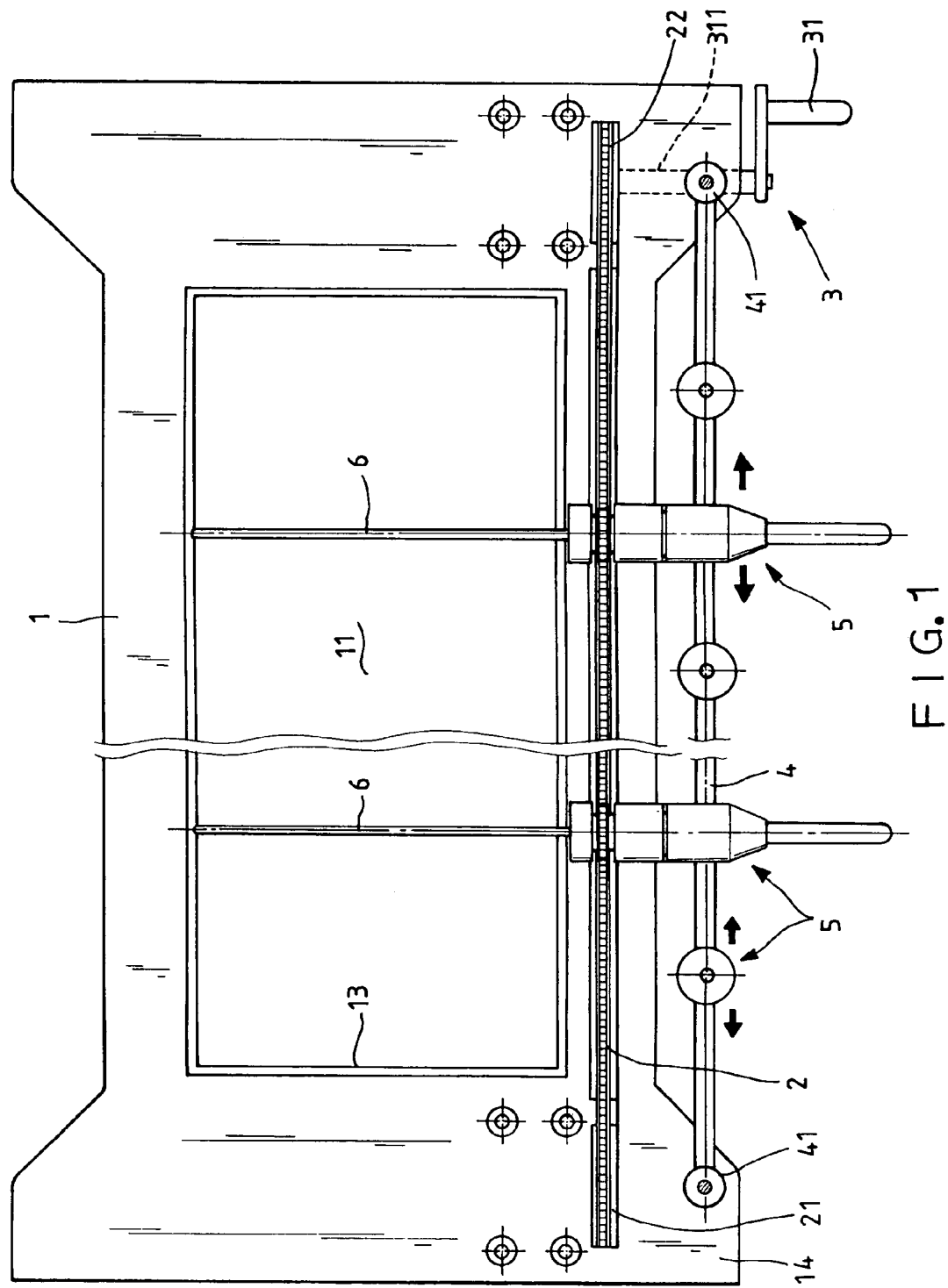
FIG. 1 is a top view of a first embodiment of the invention.
Figure 2:
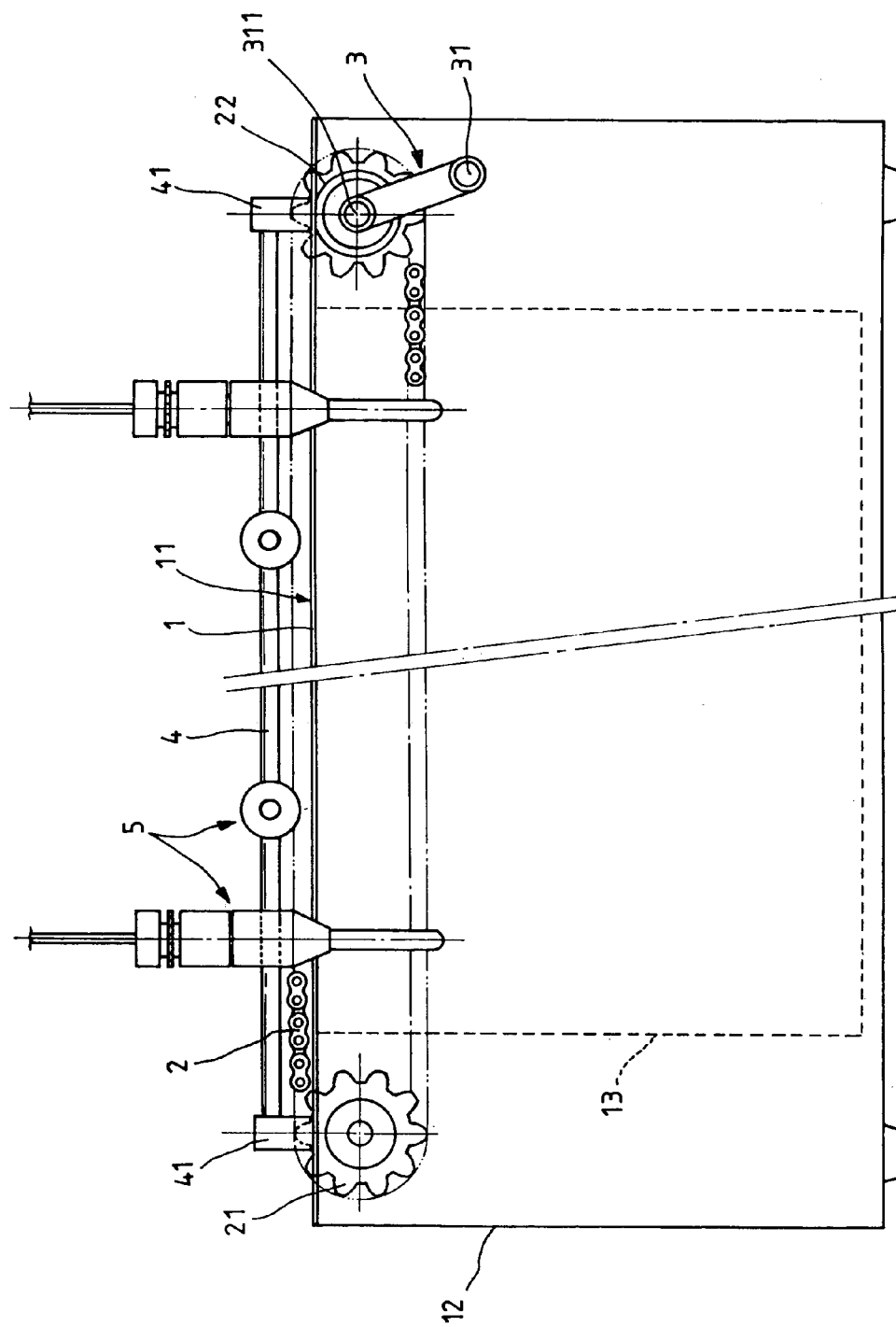
FIG. 2 is a front view of the first embodiment of the invention.

First of all, referring to FIGS. 1 and 2, an applicable embodiment of the invention includes a rack body 1 and at least one power chain 2.

The rack body 1 is adapted to install different required components. A barbecue area 11 is formed at the center of the top of the rack body 1. A support base 12 is disposed under the barbecue area 11 of the rack body 1. The support base 12 can be constructed as a container or support rack in which a charcoal container 13 with its opening directed upwards to the barbecue area 11 is disposed for storing charcoal. Meanwhile, the charcoal container 13 can be easily and conveniently taken out of the barbecue area 11 for cleaning purpose.

The power chain 2 in cooperation with two chain sprockets 21, 22 are mounted at one side of the rack body 1. One of the chain sprockets 21, 22 is coupled with a driving unit 3. The driving unit 3 includes a crank handle 31 whose crankshaft 311 is coupled with the chain sprocket 22. In this way, the power chain 2 can be rotated by turning the crank handle 31.

Figure 3:
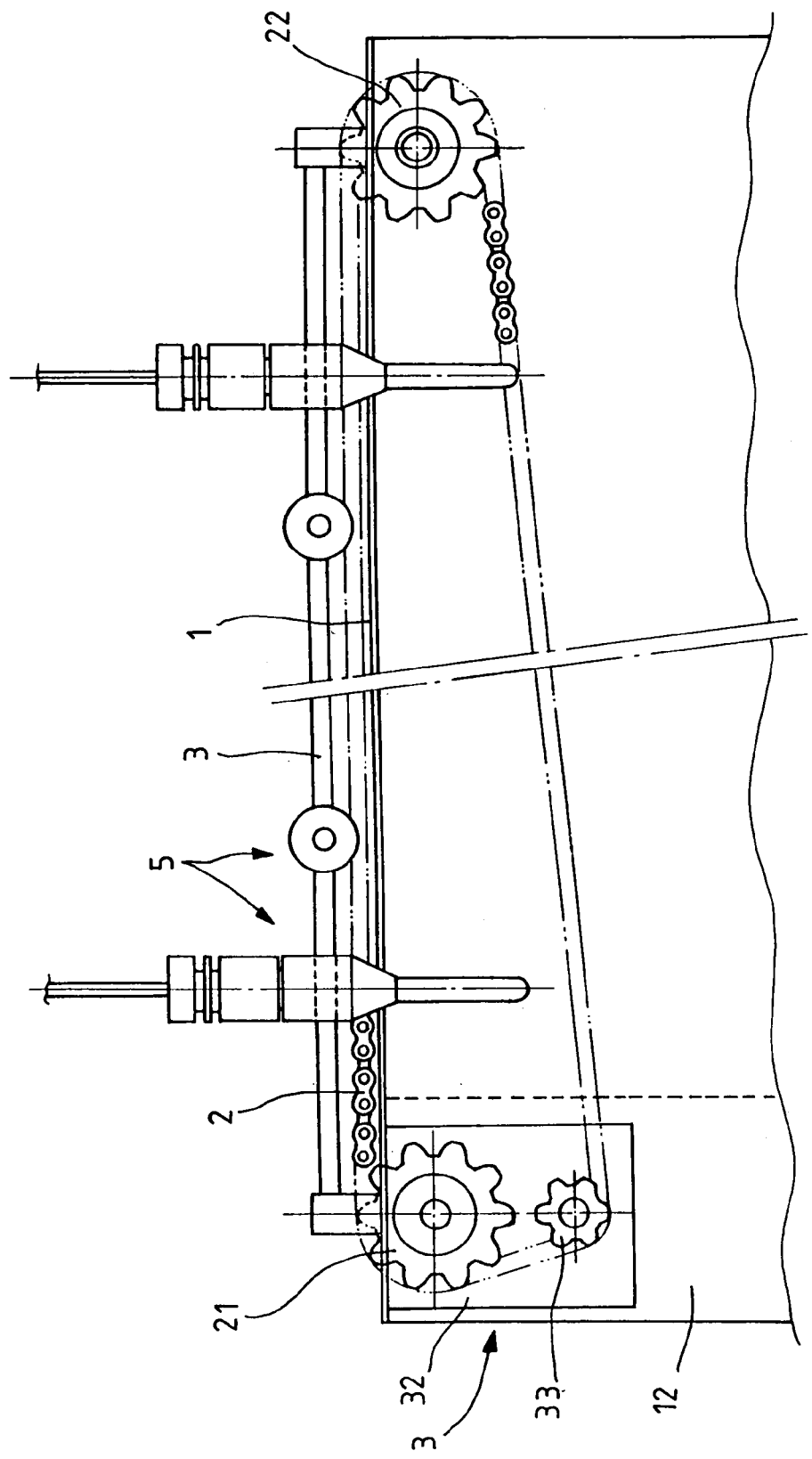
FIG. 3 is a schematic drawing of a driving unit of the invention.
Figure 4:
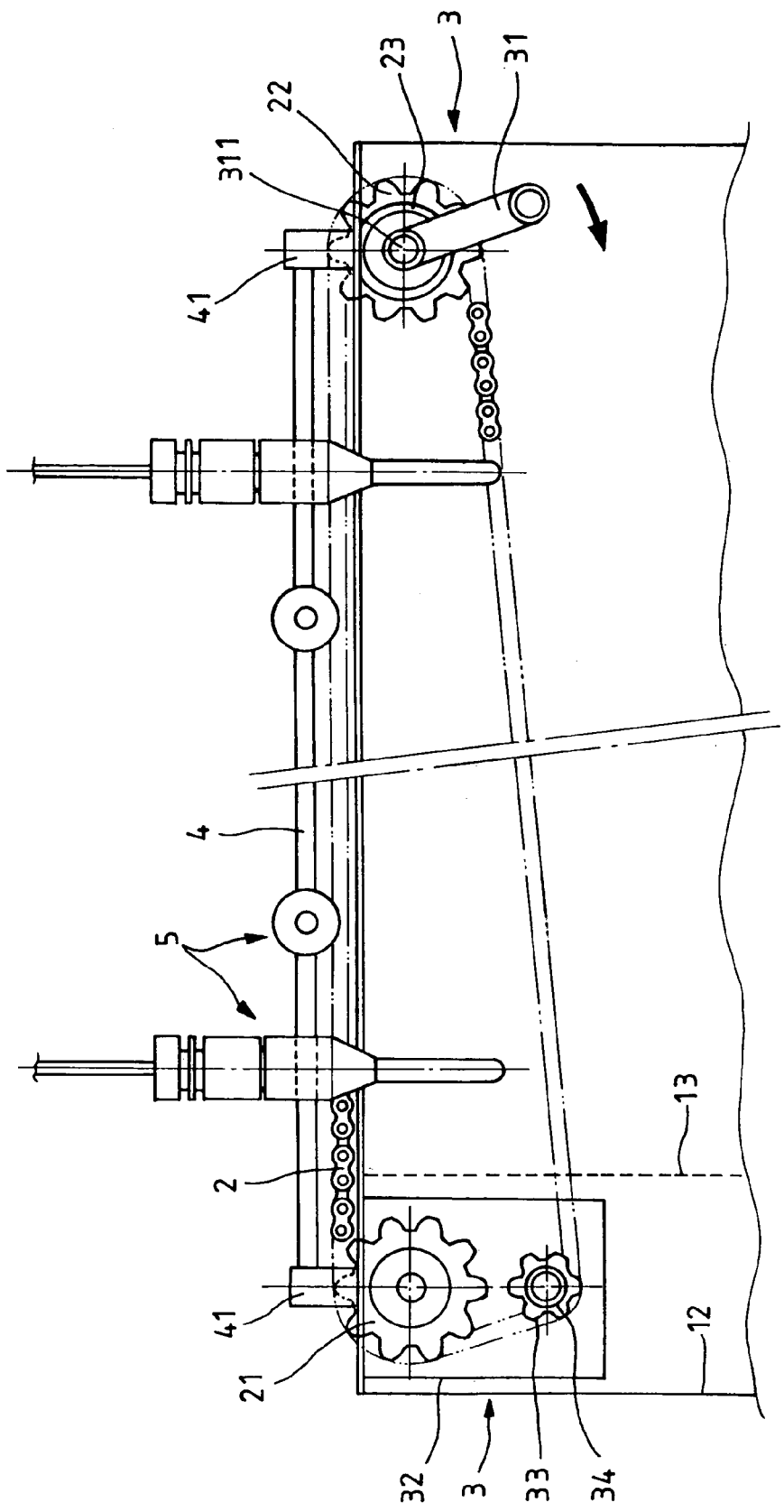
FIG. 4 is a schematic drawing of another driving unit of the invention.

As shown in FIG. 3, the driving unit 3 contains a motor 32 which is mounted under the rack body 1. The motor drives the chain 2 through the pinion 33. As shown in FIG. 4, the driving unit 3 contains the crank handle 31 and the motor 32 both of which are installed in a machine. The pinion 33 of the motor 32 is mounted on a unidirectional bearing 34. Moreover, the chain sprocket 22 in connection with the crank handle 31 is mounted on another unidirectional bearing 23. In this way, when the power chain 2 is driven by the hand crank 31, the pinion 33 in connection with the motor 32 will idle. Reversely, when the motor 32 electrically drives the power chain 2 through the pinion 33, the right chain sprocket 22 rotates but the crank handle 31 keeps still. This design provides a convenient combination of manual and automatic drive which can be selected by the user according to the requirements.

The invention further includes at least one horizontal rod 4 installed on the rack body 1 and positioned near the external side of the power chain 2. A protrusion 41 is provided at both sides of the horizontal rod 4 for fixing the horizontal rod 4 on a protruding rim 14 of the rack body 1. Thus, the rack body 1 allows the horizontal rod 4 in a hung position to facilitate the swiveling and moving actions of the spit holders 5. As shown in FIGS. 1 through 3, the spit holders 5 are located either in vertical position or in horizontal position.

Figure 5:
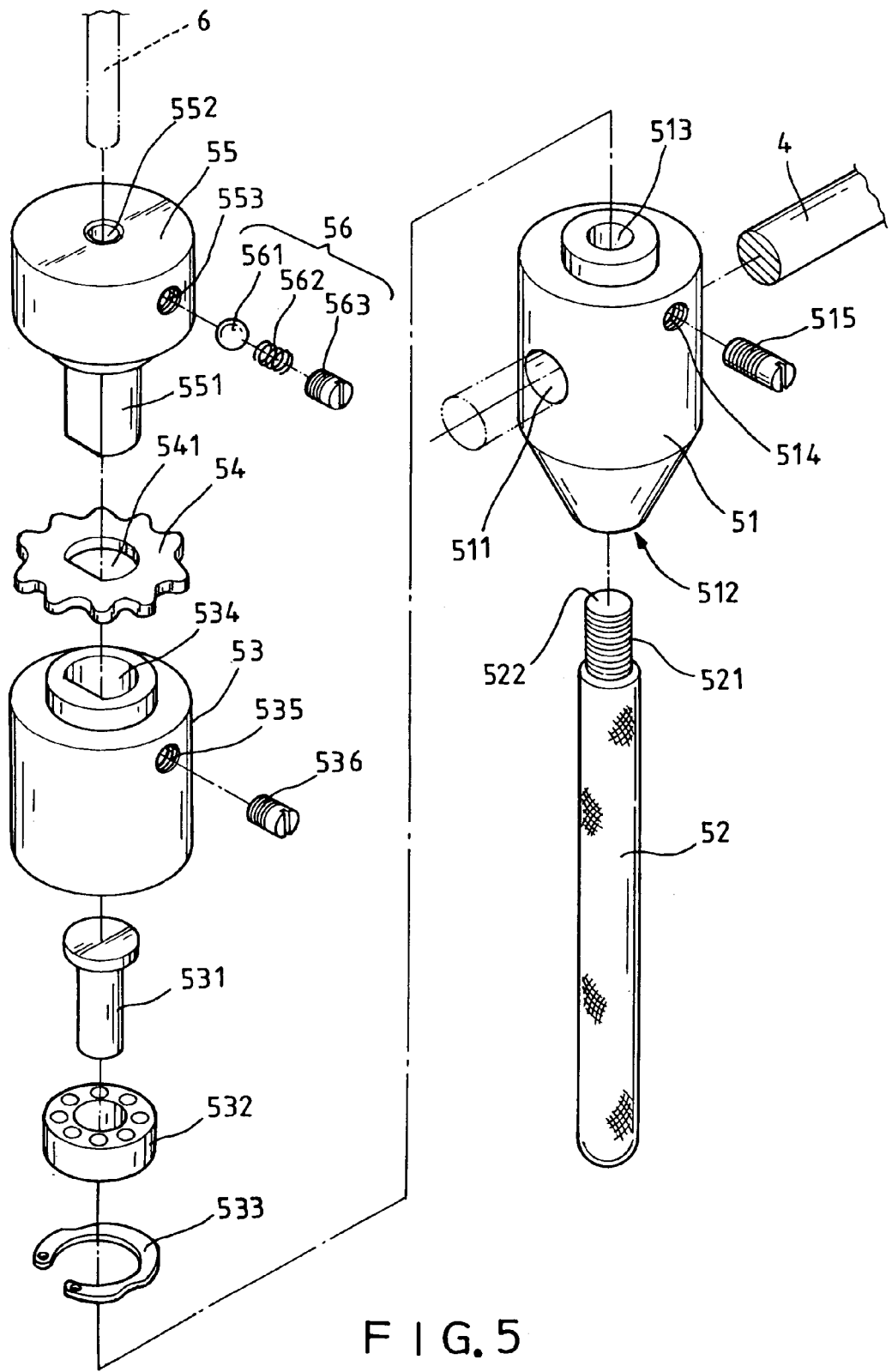
FIG. 5 is an exploded perspective view of a spit holder in accordance with the invention.
Figure 7:
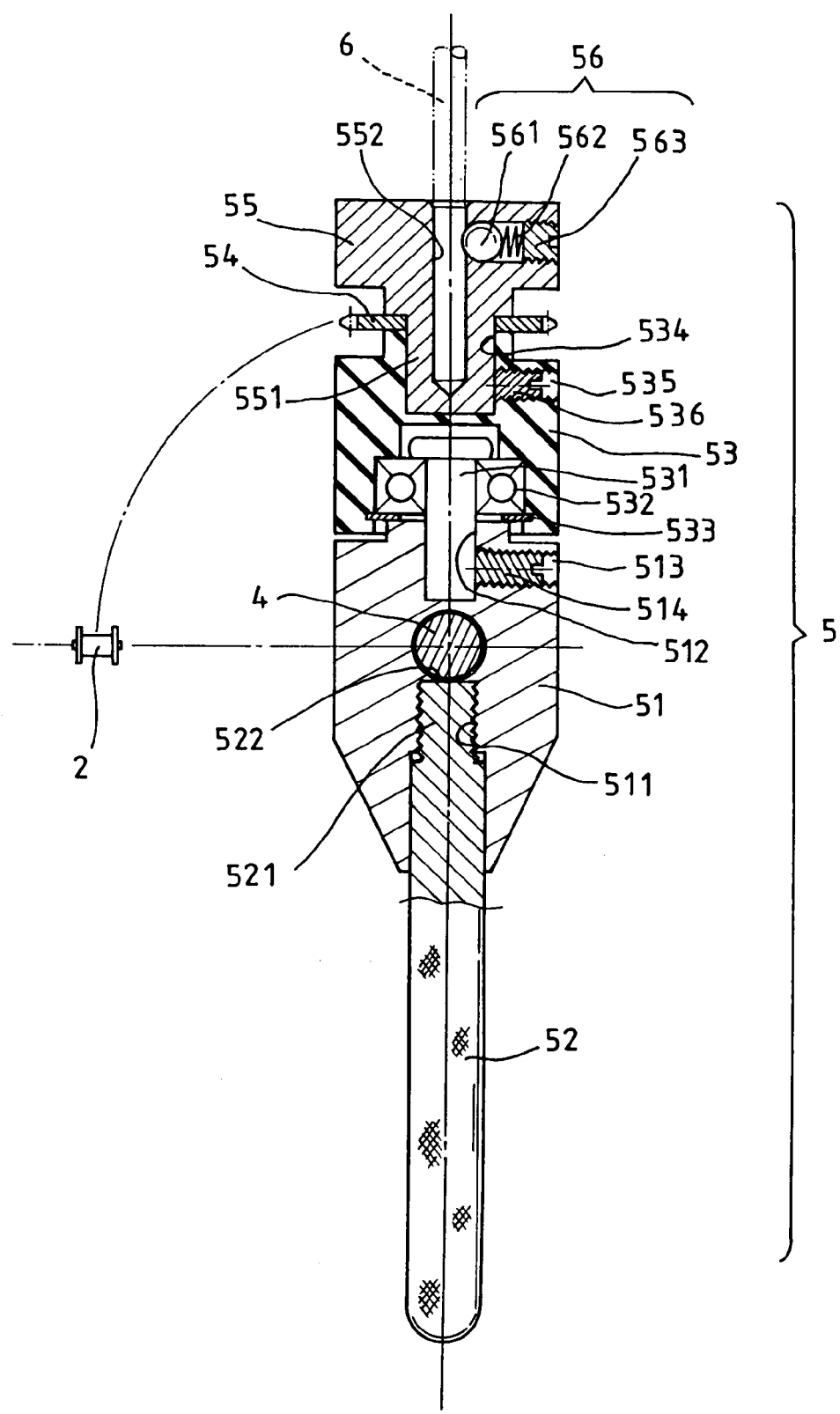
FIG. 7 is a cutaway view of the spit holder in FIG. 6.

The spit holder 5, as shown in FIGS. 5 through 7, includes:

a) a main body 51 having a middle portion with a lateral through hole 511 to allow the insertion of the horizontal rod 4, a threaded hole 512 being positioned under the lateral through hole 511, the main body 51 further having a longitudinal positioning hole 513 at the top thereof, a threaded hole 514 being radially formed in communication with the longitudinal positioning hole 513 of the main body 51 while a screw 515 is screwed in the threaded hole 514;

b) an adjusting rod 52 having a male thread 521 at the top thereof for screwing into the threaded hole 512 of the main body 51, the adjusting rod 52 having a top 522 to press against the horizontal rod 4;

c) a bearing holder 53 having a bottom mounting on a positioning bolt 531, a bearing 532 and a C-ring 533, the positioning bolt 531 being received in the longitudinal positioning hole 513 of the main body 51 to allow the rotation of the bearing holder 53 on the top of the main body 51, the bearing holder 53 further having a top hole 534 at the top thereof, a threaded hole 535 being radially formed in communication with the top hole 534 of the bearing holder 53 while a screw 536 is screwed in the threaded hole 535;

d) a pinion 54 disposed at the top of the bearing holder 53, the pinion 54 having a mounting hole 541; and e) a clamping unit 55 having a mounting head 551 passing through the chainwheel 54 and fitting in the top hole 534 of the bearing holder 53.

The clamping unit 55, the chainwheel 54, and the bearing holder 53 are formed in noncircular shape such that they are rotatable on the main body 51 while they are fixed in placed by a screw 536 at the side of the bearing holder 53. The clamping unit 55 has a vertical hole 552 at the top thereof for insertion of a spit 6 that is fixed in place by a positioning element 56 fitting in horizontal direction into a fixing hole 553.

The positioning element 56 can be constructed as a screw 563. Alternatively, a steel ball 561 and a spring 562 can be added for creating an elastic clamping force to act radially on the spit 6 to be inserted into the vertical hole 552.

Figure 8:
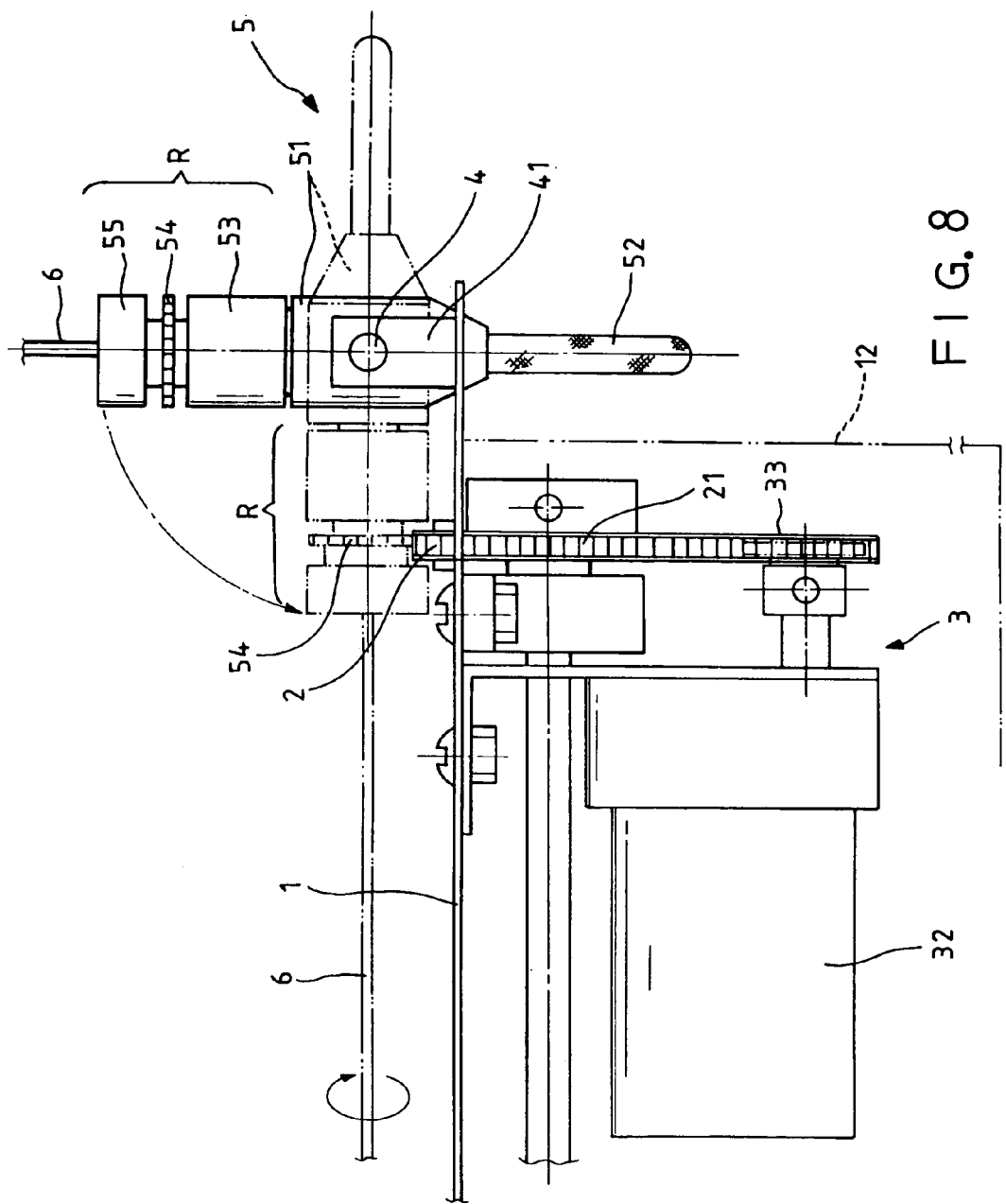
FIG. 8 is a side view of partial structure of the embodiment of the invention.

In operation, as shown in FIGS. 6 through 8, the adjusting rod 52 is firstly loosened to move the main body 51 of the spit holder 5 on the horizontal rod 4 axially. Then, the spit holder 5 is fixed at a desired place and turned the standing spit holder 5 by 90° so that the chain wheel 54 meshes with the power chain 2. As shown in FIG. 8, no matter if the power chain 2 is driven by hand or by the motor 32 of the driving unit 3, the movement combination R of the clamping unit 55, the chainwheel 54 and the bearing holder 53 rotates on the main body 51. So, the spit 6 will be forced to rotate and the meat is evenly roasted. When the meat is sufficiently roasted, the adjusting rod 52 is swiveled to erect the spit holder 5. Thereafter, the adjusting rod 52 is turned to fix the whole spit holder 5 in position on the horizontal rod 4. It is very convenient in use.

Figure 9:
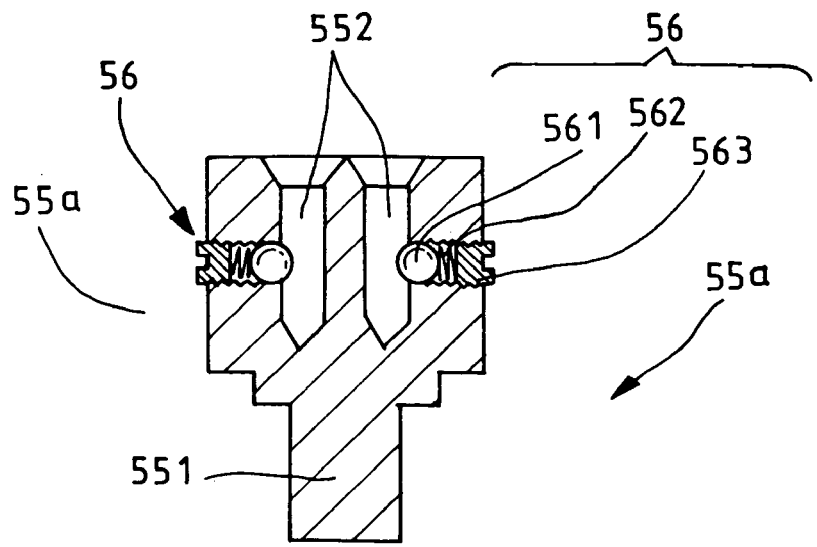
FIG. 9 is a cutaway view of a positioning element of another embodiment in accordance with the invention.
Figure 10:
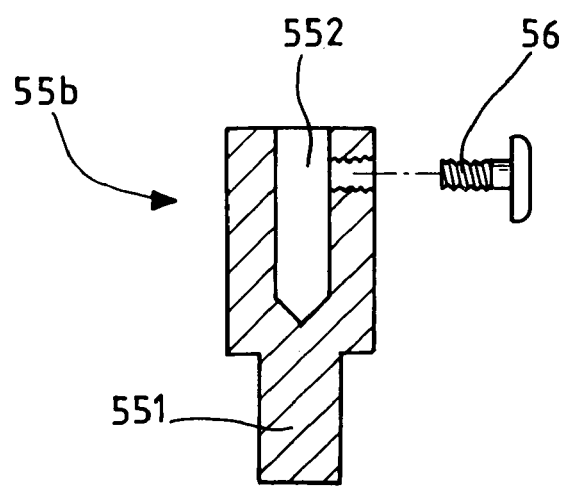
FIG. 10 is a cutaway view of the positioning element of a further embodiment in accordance with the invention.

As shown in FIG. 9, the clamping unit 55a of another embodiment in accordance with the invention is designed in a structure of two vertical holes 552 for two spits; the other structure thereof is identical to that of the above mentioned clamping unit 55 so that no further descriptions are given hereinafter. Furthermore, it can also be designed into another variation shown in FIG. 10. A positioning element 56 is disposed near the vertical holes 552 of the clamping unit 55b. The positioning element 56 has male thread and fits directly into the spit (not shown) within the vertical hole 552 without using the spring 562 and the steel ball 561. This structure is particularly suitable to fix the spits with greater dimensions for increasing its stability.

No matter which kind of the above-mentioned clamping unit is employed, it can be easily connected to the chain wheel 54 and the bearing holder 53 because the mounting heads 551 at the bottom thereof have the same dimensions.

Furthermore, the power chain 2 and the horizontal rod 4 are mounted on one side of the rack body 1 in accordance with the above-mentioned embodiments. In fact, a power chain 2 and a horizontal rod 4 can also be fitted to the other side thereof. In this case, a plurality of spit holders is disposed on both sides of the rack body 1. This variation has the same function as the aforementioned embodiments so that no further descriptions thereto are given hereinafter.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A barbecue rack with movable and swivelable spit holders, comprising:

a) a rack body having a barbecue area at the top thereof and a support base under the barbecue area;

b) at least one power chain, the power chain in cooperation with two chain sprockets being mounted at one side of the rack body, one of the chain sprockets being coupled with a driving unit for bringing the power chain in rotation;

c) at least one horizontal rod installed on the rack body and positioned near the external side of the power chain, d) at least one spit holder disposed in such a way that the horizontal rod perpendicularly penetrates through the spit holder, the spit holder being movable in axial direction and rotatable about the horizontal rod, the spit holder including:

i) a main body having a middle portion with a lateral through hole to allow the insertion of the horizontal rod, a threaded hole being positioned under the lateral through hole, the main body further having a longitudinal positioning hole at the top thereof;

ii) at least an adjusting rod screwing into the threaded hole of the main body, the adjusting rod having a top to press against the horizontal rod;

iii) a bearing holder having a bottom mounting on a positioning bolt, a bearing and a C-ring, the positioning bolt being received in the longitudinal positioning hole of the main body to allow the rotation of the bearing holder on the top of the main body, the bearing holder further having a top hole at the top thereof;

iv) a pinion disposed at the top of the bearing holder, the pinion having a mounting hole; and v) a clamping unit having a mounting head passing through the chainwheel and fitting in the top hole of the bearing holder, the clamping unit, the chainwheel, and the bearing holder being integrated in a body that is rotatable on the main body, the clamping unit having a vertical hole at the top thereof for insertion of a spit that is fixed in place by a positioning element fitting in horizontal direction into a fixing hole, wherein the main body is movable in the axial direction and swivelable up and down in the vertical or the horizontal position by turning the adjusting rod; and wherein the clamping unit can be driven in rotation by meshing the chainwheel with the power chain.

2. The barbecue rack with movable and swivelable spit holders as recited in claim 1 wherein the support base is selected from a group consisting of a container and a support rack.

3. The barbecue rack with movable and swivelable spit holders as recited in claim 1 wherein the driving unit includes a crank handle.

4. The barbecue rack with movable and swivelable spit holders as recited in claim 1 wherein the driving unit includes a motor and a pinion.

5. The barbecue rack with movable and swivelable spit holders as recited in claim 1 wherein a threaded hole is radially formed in communication with the longitudinal positioning hole of the main body while a screw is screwed in the threaded hole.

6. The barbecue rack with movable and swivelable spit holders as recited in claim 1 wherein a threaded hole is radially formed in communication with the top hole of the bearing holder while a screw is screwed in the threaded hole.

7. The barbecue rack with movable and swivelable spit holders as recited in claim 1 wherein the positioning element for the spit includes a steel ball, a spring and a screw.

8. The barbecue rack with movable and swivelable spit holders as recited in claim 7 wherein the clamping unit includes two vertical holes while two positioning elements are provided.

* * * * *